United States Patent [19]
Tomchak

[11] Patent Number: 5,194,156
[45] Date of Patent: Mar. 16, 1993

[54] WATER PURIFIER FAUCET FITTING

[76] Inventor: Sigfrid A. Tomchak, 15235 Weststate St., Westminster, Calif. 92683

[21] Appl. No.: 678,313

[22] Filed: Oct. 18, 1991

[51] Int. Cl.$^5$ ............................................. B01D 61/08
[52] U.S. Cl. .................................. 210/541; 210/542; 285/8; 285/33
[58] Field of Search ....................... 285/8, 33; 210/634, 210/644, 649–652, 321.6, 321.72, 449, 541, 542

[56] References Cited

U.S. PATENT DOCUMENTS 4,822,076  4/1989  Padilla ...................................... 285/8

Primary Examiner—Frank Sever
Attorney, Agent, or Firm—Albert O. Cota

[57] ABSTRACT

An improved faucet having a quick disconnect adapter, fitting for connecting a sink faucet, to a water purifier which has a body (22) defining three passageways for receiving and retaining three jointly sheathed resilient tubes. Each passageway has a separate function, i.e., supplying water to the purifier receiving and dumping overflow and metering waste flow. The tubes are held in place on a side connector (28) with a tube retainer (72). A quick-disconnect assembly attaches the fitting to the faucet adapter and includes a sleeve (50) with inwardly facing jaws (56) and a retracting collar (66) with a compression spring (68) permitting manual release or attachment by withdrawal of the jaws. A two-position valve (82) provides volume control for the waste flow and allows periodical flushing of deposits from the purifier.

13 Claims, 3 Drawing Sheets

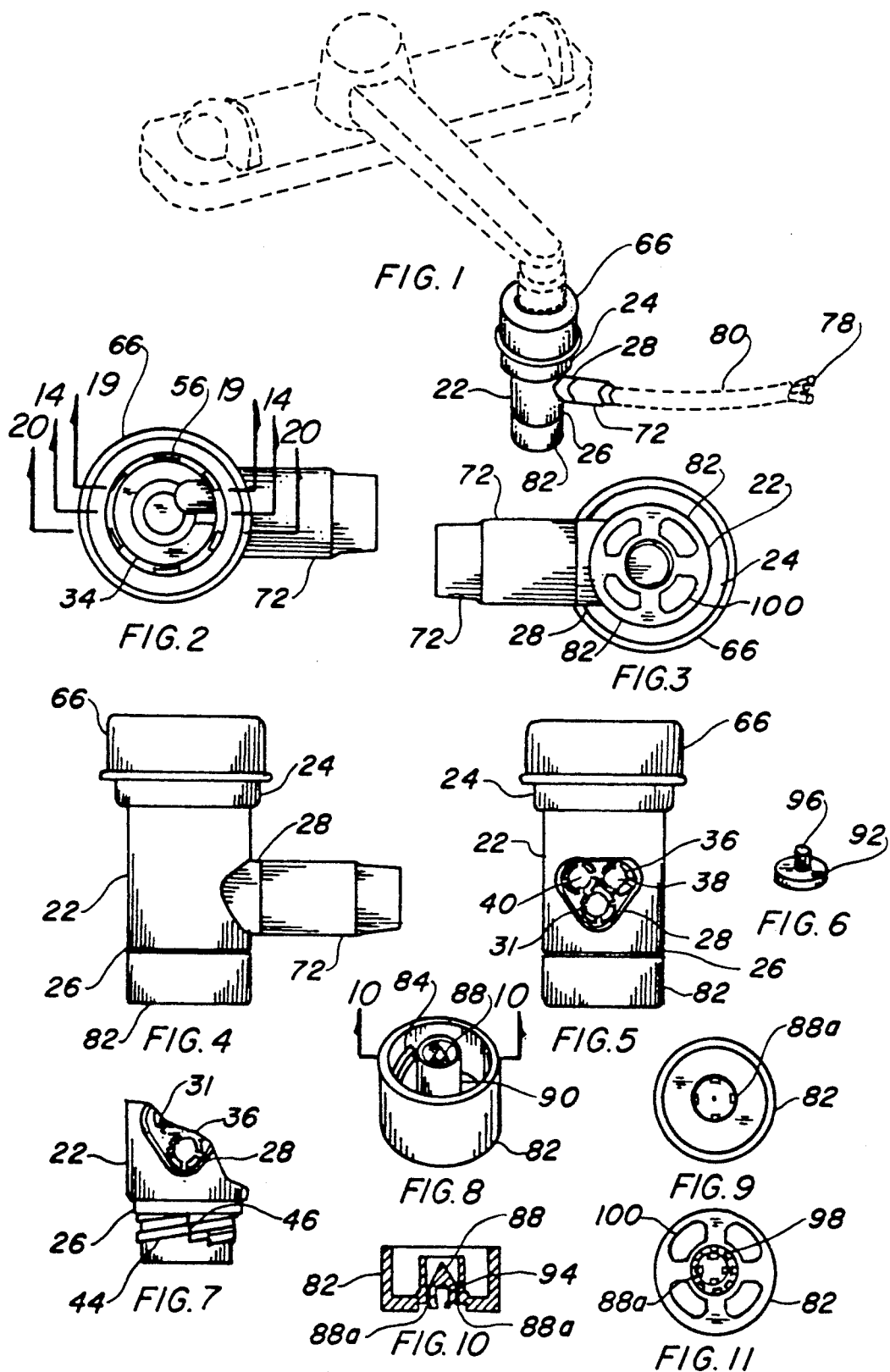

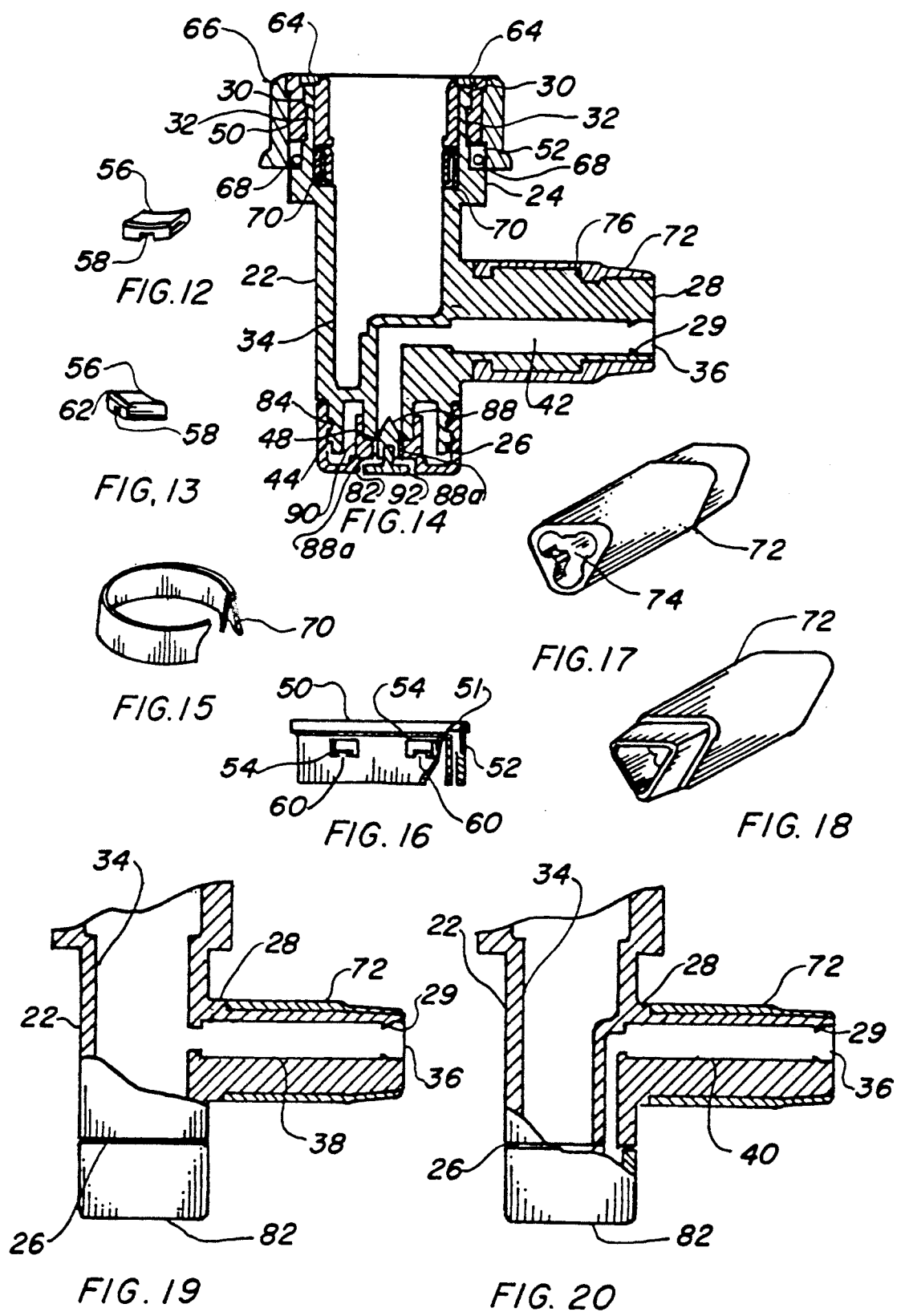

WATER PURIFIER FAUCET FITTING

TECHNICAL FIELD

The present invention relates to fluid conducting fittings in general and more specifically to fittings for connecting a reverse osmosis water purifier to a faucet.

BACKGROUND ART

Generally reverse osmosis water purifying apparatus utilize the water from a household or commercial system piped directly to the device, with overflow and drains for the concentrate or brine waste piped to the sewage disposal system. Some prior art has been directed to this end however, couplings and connectors for various applications have been developed containing some limited structural similarity.

A search of the prior art did not disclose any patents that read directly on the claims of the instant invention however, the following U.S. patents were considered related:

| PATENT NO. | INVENTOR | ISSUED |
|---|---|---|
| 4,599,171 | Padilla et al | 8 July 1986 |
| 4,515,399 | Sullivan et al | 7 May 1985 |
| 4,482,456 | Grayson | 13 November 1984 |
| 4,480,855 | Rosenbaum | 6 November 1984 |

The faucet fitting for which this improvement is directed is to a combined fitting and system developed in 1984 by the inventor with a patent issuing in 1986 under U.S. Pat. No. 4,599,171 with Padella as a joint inventor. The function of the fitting is basically the same however, dramatic changes have been made to its structure, produceability, reliability and operation. The novelty exists in changes that eliminate costly sonic welding of parts, indexing to preclude improper assembly snapping the components into place in the assembly during construction and installation as well as a completely unique valve arrangement which different entirely in structure and functional operation. Of the ten component parts now utilized no less than seven are improved or replaced entirely which will be explained in detail later. While the reverse osmosis system by itself is not changed, the improvements in the fitting distinguish entirely from this prior art.

Sullivan et al teaches an improved flexible connector having multiple passageways inside with an elastomeric seal that accommodates angular movement between the input and output conduits. The connector also distributes compressive forces evenly with respect to the longitudinal axis.

Grayson is concerned with the entire reverse osmosis liquid treating apparatus including the tank, liner, hoses and an automatic valve that controls the flow of effluent untreated liquid to a spout that extends exteriorly to the valve housing terminating at a discharge end. A manually actuated control valve modulates the flow of effluent-untreated liquid to the tank.

Rosenbaum directs his attention to pipe joints for plastic pipe or tubing in the form of internal couplers for connecting adjacent ends of corrugated pipe. The coupling has projecting cleats of relatively thin material to facilitate flexing and is extruded and then molded in construction.

DISCLOSURE OF THE INVENTION

As this invention is specifically for the improvement of the fitting, the differences are also clearly visible particularly in view of the inventors earlier patent.

One of the problems of manufacture of the original invention had to do with the necessity of sonic welding the upper part of the body to the lower body part. While this procedure is well known in the art and frequently used in injection molded thermoplastic components, if the weld was not perfectly executed the body would leak. Even the smallest seepage is unacceptable as the fitting is connected directly to a water faucet under constant hydraulic pressure. Further, the upper part of the body had a tendency to cock sideways and jam when pressed together causing a high rate of rejection. In order to verify the integrity of the weld, a pressure test was necessitated consuming considerable labor to accomplish including fitting the part to the fixture and removing it after the test which made the task very labor intensive. The improvement eliminates these problems completely as the main structure is in one piece with fingers upstanding from the body interfacing with socket in a keeper sleeve that is easily indexed and set into place. No welding or pressure testing is now required and the assembly procedure is simplified as the sleeve simply snaps into place over the fingers maintaining attachment of the components.

Another problem that contributed to a high scrap rate was the similarity in appearance of the top and bottom of the beveled locking jaws, formerly designated plastic wedges in U.S. Pat. No. 4,599,171. If only one of these jaws were assembly upside down, the entire subassembly would have to be rejected and discarded as there was no way to disassembly the already welded device. In order to circumvent this problem, the jaws now contain a groove in one side and the keeper sleeve has an upright projection within the mating slot allowing the jaw to interface only in the proper orientation.

Previously, the tubes from the purifier were forced onto individual barbed nipples during installation of the fitting to the reverse osmosis device. A compression ring was then fit over the three hoses on the barbed nipples and a collar was threadably attached to the sidearm section of the body. This procedure required time to individually manipulate each hose and the collar was then rotated to complete the attachment. The improvement alters this procedure considerably by inserting the tubes into a inwardly tapered hole and slipping a snap-fit tube retainer over the top. The integrity of the water tight seal is maintained by the inside hydraulic pressure pushing outwardly slightly expanding the resilient tube into a water tight seal with the tubes held firmly in place by pointed projections imbedding into the outside of the tube. The tube retainer is slipped forward over the sheath holding the three tubes simultaneously compressing the split barbed side connector without further handling or manipulation. One element is therefore completely eliminated from the connection again improving the overall cost of the device.

A problem with the previous fitting was not realized until many units were in use as it was found that the owner did not understand the function of the butterfly valve and tried to overtighten the stem in an attempt to eliminate the dripping. In actuality, the function of the fitting controls the flow of waste concentrates or brine from the purifier allowing a small flow to continually drip into the sink and be disposed of.

Occasionally the valve is opened to flush the deposits from within the purifier when the output decreases. As the device is made of thermoplastic overtorquing of the valve leads to breakage or stripping of the threads which makes the purifier inoperative until a replacement is found as the unit will not function without the valve. Not only does the improvement solve the problem of inadvertently breaking the valve but also takes the necessity of understanding the complete operation away from the operator. The valve is now a cap-like structure that rotates only a partial turn from totally open to fully closed and the operation may be explained through directional arrows as an example "drip" in one direction and "flush" in another with either an arrow above the word or nearby as an alternative equally understandable nomenclature or combination thereof. Further the valve contains stops at each end removing the problem of excessive torque when the valve body is rotated. The movement is mechanically interrupted which is obvious to the user as further tension does not change the position.

Another problem with the original fitting was that users would loosen the valve by unthreading and it would be lost into the drain of the sink. While this does not appear to be particularly important by itself if this happens, the function of the entire purifier is lost completely.

The improved two-way valve further permits the concentrate or brine waste flow to be diffused as it is released into the sink precluding splashing outside on the counter or floor. This object of the invention is accomplished using a series of small holes below the needle with the flow directed horizontally through a number of diminutive slots and the direct open area is covered by a diffuser. This arrangement allows air to mix with the water and aerate the waste flow completely eliminating the possibility of splashing even if something is in the way of the outlet flowpath.

These and other objects and advantages of the present invention will become apparent from the subsequent detailed description of the preferred embodiment and the claims taken in conjunction with the accompanying drawings.

BRIEF DESCRIPTION OF THE DRAWINGS

FIG. 1 is a partial isometric view of the preferred embodiment illustrated mounted on a sink faucet with the faucet and hose attached to the purifier shown in dashed lines.

FIG. 2 is a plan view of the preferred embodiment.

FIG. 3 is a bottom view of the preferred embodiment.

FIG. 4 is a side elevation view of the preferred embodiment.

FIG. 5 is an end view of the preferred embodiment.

FIG. 6 is a partial isometric view of the diffuser removed from the valve for clarity.

FIG. 7 is a fragmentary front view of the body with the valve removed.

FIG. 8 is a partial isometric view of the valve removed from the invention for clarity.

FIG. 9 is a top view of the valve removed from the invention for clarity.

FIG. 10 is a cross-sectional view taken along lines 10—10 of FIG. 8.

FIG. 11 is a bottom view of the valve removed from the invention for clarity.

FIG. 12 is a front isometric view of a locking jaw removed from the invention for clarity.

FIG. 13 is a side isometric view of a locking jaw removed from the invention for clarity.

FIG. 14 is a cross-sectional view taken along lines 14—14 of FIG. 2.

FIG. 15 is a partial cut away isometric view of the seal removed from the invention for clarity.

FIG. 16 is a cut away side view of the sleeve removed from the invention for clarity.

FIG. 17 is a partial isometric view of the contiguous locking end of the tube retainer removed from the invention for clarity.

FIG. 18 is a partial isometric view of the sheath end of the tube retainer removed from the invention for clarity.

FIG. 19 is a cross-section view taken along lines 19—19 of FIG. 2.

FIG. 20 is a cross-sectional view taken along lines 20—20 of FIG. 2.

BEST MODE FOR CARRYING OUT THE INVENTION

Figure 21:
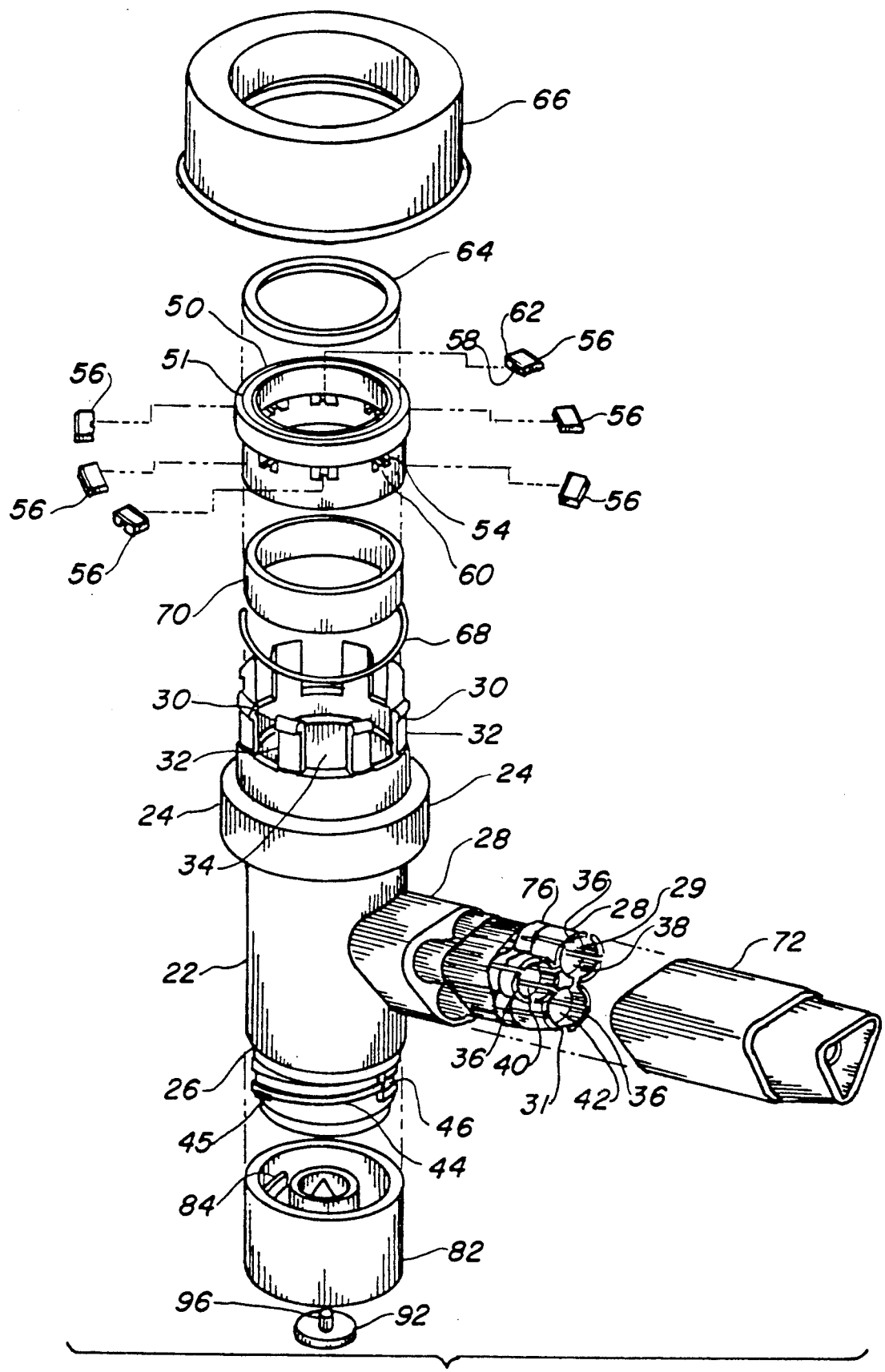
FIG. 21 is an exploded view of the invention.

The preferred embodiment, as shown in FIGS. 1 through 21 is comprised of a body 22 with a top 24, bottom 26 and side connector 28. The top 24 of the body contains a number of upwardly extending fingers 30 each having an inward indentation 32 on the outside surface. The body 22 is formed with a hollow chamber 34 inside as shown in FIG. 14 with the fingers 30 integral with the top 28.

FIGS. 14, 19 and 20 illustrate three separate fluid passageways within the body 22 that all start or terminate at the end of the side connector 28 with each having an inwardly tapered bore 36. The first passageway 38 is for supplying water from the faucet to the purifier with the inlet in the hollow chamber 34 of the body 22 and the outlet at the side connector 28 as illustrated in FIG. 19. The second passageway 40 allows an unrestricted flowpath for overflow water when the purifier reservoir is full and the process continues to operate. The entry for this passageway 40 is at the side connector 28 and the exit is at the bottom 26 of the body 22 depicted in cross section in FIG. 20. The third passageway, 42 shown in FIG. 14, has the ingress at the side connector 28 and egress in the center of the body bottom 26. This passageway serves two purposes first to allow the concentrates or brine from the purifier to be disposed of in a metered manner and second to flush deposits from the apparatus when the reverse osmosis device becomes clogged.

The side connector 28 is formed in triangular shape as shown in FIG. 21 and has a plurality of splits 31 in the periphery around the three tapered bores 36. Each segment between the splits contains an inwardly facing internal pointed projection 29 that may interface and retain externally mounted tubes when forced inward to a straight configuration permitted by the resilience of the material.

The bottom portion of the body 22 contains a set of partial turn external threads 44 on an inward stepped shoulder. These threads 44 unlike well known circumferential threads make only one partial turn around the periphery and terminate in a stop 46 created by the opposed thread. Further the inside of the bottom 26 is hollow except for a raised valve seat 48 that is in alignment with the third passageway 42.

On the top 22 of the body quick disconnect means are provided allowing the faucet fitting to be connected to a male coupling adapter that has been attached to a water faucet. This quick disconnect means consists of a jaw keeper sleeve 50 shown in FIG. 16 by itself and in the exploded view 21 relative to the other elements. The sleeve 50 has a number of cavities 52 that enclose and retain the fingers 30 of the body 22 permitting the sleeve to be permanently attached to the top of the body. This sleeve 50 also includes a series of slots 54 completely therethrough located between the cavities 52 as depicted in FIG. 21. When attached, the sleeve 50 becomes a structural part of the body 22.

The slots 54 slideably receive a number of inwardly facing beveled locking jaws 56 preferably six illustrated in FIGS. 12, 13 and 21. Each jaw 56 has a groove 58 therein, illustrated best in FIG. 12, and the sleeve 50 contains an upright projection 60 on the inside of the slot 54 such that the groove 58 in the jaw 56 slideably interfaces in the projection eliminating the possibility of improper installation. The bevel 62 of the jaw 56 is positioned nearest to the top 24 of the body 22 embracing the faucet adapter when the fitting is placed thereon.

An enclosing ring 64, illustrated directly above the sleeve 50 in FIG. 21, covers the top of the cavities 52 as the cavities are stepped outwardly on the upper portion allowing the inward indentation 32 to snap into place when the sleeve 50 and body 22 are assembled. The ring 54 is pressed into place in a circular groove 51 on the sleeve 50 serving only as an enclosure to cover the exposed cavities 52 and fingers 30 located therein.

A compression spring 68 depicted in FIG. 21, is contiguous with the top of the body 22 and sleeve 50 maintaining an upward locked position of the jaws 56 to the faucet adapter.

A retracting collar 66 is the manually actuating part of the quick disconnect means and slideably passes over the fingers 30 of the body 22 and sleeve 50 maintaining the jaws 56 in an outward position when urged away from the body by the spring 68. This action permits the jaws to retract when manually forcing the collar 66 onto the body 22 thereby compressing the spring 64 allowing the jaws 56 to retract and thus permitting removal of the fitting from the faucet adapter. This method of quick disconnecting the fitting from the faucet adapter incorporates all of the improvements previously described.

When the invention is positioned on the faucet adapter, a resilient double lip seal 70 provides the water tight hermetic closure therebetween. The seal 70 is disposed within the hollow chamber 34 of the body 22 and comprises a resilient body folded double into a U-shaped ring. This configuration seals both on the double portion, illustrated in FIG. 15, to the adapter and maintains the integrity of the seal against the cavity 34 due to be outward force of the water pressure from the faucet.

FIGS. 17 and 18 illustrate connecting element which is a hollow tube retainer 72 shown by itself in FIGS. 17, 18 and FIGS. 14 and 19-20 in cross section. This retainer 72 has internal indentations 74 that snap over a series of barbs 76 on the split side connector 28. The retainer 72 holds, three flexible unitedly sheathed resilient tubes 78 depicted in dotted lines of FIG. 1. These tubes 78 are connected to the reverse osmosis device and convert water or brine from the apparatus to the fitting for supply water, return waste and overflow. The retainer 72 is shaped like a hollow elongated triangle and is sized to fit the sheath of the tubes 78 holding all of the tubes in place simultaneously. The indentations 74 are formed on the inside of the retainer 72 allowing them to tightly snap over the side connector barbs 76 maintaining a fluid tight tube seal created by the forward thrust of the installation snapping into place compressing the split portions of the connector 28 against the tubes with the internal pointed projections deforming the resilient material of the tube. The tubes enter the tapered bores 36 of the passageways 38, 40 and 42 completing the hermetic seal. Further, the first end of the retainer 72 shown in FIG. 17 locks over the side connector 28 and the second or other end of the retainer has an aperture the same configuration as the tube containing sheath 80 housing the three resilient tubes 78. The fit between the sheath 80 and second end of the retainer 72 is just tight enough to maintain a secure joint for the sheathed tubes 78.

Another important improvement is an entirely different hollow cap-like two-position valve 82 that is rotatably attached to the body 22 on the partial turn external threads 44. The valve 82 is formed much like an inverted cap as shown in FIGS. 8-11 and contains a pair of teeth 84 on the inside facing toward the center. The teeth 84 mesh with the partial turn external threads 44 formed into the body 22 and allow the valve free but limited rotation.

FIG. 7 illustrates the threads 44 that are formed in such a manner that they create a stop 86 when the valve is turned to its full rotation in either direction. The valve 82 is held in place with a snapping action during assembly overcoming the threads, locking it into place when the teeth 84 engage the threads 44. To accomplish this assembly procedure the threads 44 contain a ramp 45 on the outside only and the top of the thread is slightly radiused at the interface. The ramp 45 is only the width of the teeth 84 and function only for assembly purposes. The valve 82 further contains an integral cone shaped vented needle 88 located in the center facing body 22. The needle 88 is surrounded by a circular upstanding cup 90 and is in direct alignment with the seat 48 in the bottom 26 of the body 22. The valve 82 is rotated to its first position which maintains a very close space relationship between the needle 88 and the seat 48 allowing only a small amount of fluid to exit the fitting through the vents. The vents are illustrated in FIG. 10 and are designated 88a for clarity. This controlled drip permits the purifier to function properly continually expelling concentrates or brine. The stop 86 prevent further rotation eliminating the problem of overtighting threads as the user can feel the stopped position. The second or open position allows a large amount of fluid to pass flushing deposits from the purifier through the third or vent passageway 42 when the valve 82 is rotated in the opposite direction. Again the stop 86 impedes the movement at the full open position.

When in the second position in order to prevent splashing a diffuser 92, shown in FIG. 6 singly, is pressed into a recess 94 in the valve 82 directly beneath the needle 88 using, as the attachment means, a raised neck 96 slightly smaller than the recess 94 allowing a slight interference fit. To further the control of splashing a series of slits 98 are formed around the diffuser 92 in communication with the vents 88a. These slits 98 are not in alignment therefore the waste water or brine is aerated by mixing with the surrounding air.

The valve 82 also contains a number of overflow openings 100 around the outside of the bottom surface to allow water to drain from the second passageway 40 or overflow vent in the bottom of the body 22 and freely drain from the fitting.

The faucet fitting is preferably constructed from injection molded thermoplastic or the like with the exception of the spring 68 which is steel and the seal 70 which is synthetic rubber or molded resilient plastic.

While the invention has been described in complete detail and pictorially shown in the accompanying drawings, it is not to be limited to such details since many changes and modifications may be made in the invention without departing from the spirit and the scope thereof. Hence, it is described to cover any and all modifications and forms which may come within the language and scope of the claims.

I claim:

1. An improved reverse osmosis water purifier faucet fitting for connecting to a faucet equipped with a male coupling adapter comprising means for cooperating with a reverse osmosis purifier, including:
    a) a body having a split side connector with three fluid passageways therein, said connector passageways having internally tapered bores for receiving and retaining three jointly sheathed resilient tubes in concert,
    b) a snap-on triangular shaped hollow tube retainer adaptably embracing the split side connector for locking resilient tubes in place into the tapered bores,
    c) quick disconnect means integral with the body allowing the faucet fitting to be connected to the adapter, and
    d) a two position valve threadably joined to the body providing volume control of one of the passageways.

2. The faucet fitting as recited in claim 1 wherein said three passageways further comprise a first passageway, a second passageway and a third passageway, the first passageway having an inlet within the body in communication with the quick disconnect means and an outlet at the side connector for supplying water from the faucet to the purifier, the second passageway having an entry at the side connector and an exit adjacent to the valve allowing an unrestricted flowpath therebetween for ejecting overflow water from the purifier, and the third passageway having ingress at the side connector and egress at the valve providing a conduit for rejection of waste concentrates from the purifier when the valve is a metering position and flushing deposits from the purifier when the valve is in an open position.

3. The faucet fitting as recited in claim 1 wherein said quick disconnect means further comprise:
    a) a jaw keeper sleeve having a plurality of inwardly facing beveled locking jaws therein with the sleeve embracing the body, and
    b) a retracting collar slidingly confined by the sleeve having a compression spring between the collar and the body urging the collar into a lock position relative to the jaws permitting the collar to be manually retracted from the jaws thus allowing the fitting to be attached or released from the faucet adapter.

4. The faucet fitting as recited in claim 1 wherein the fitting is constructed from injection molded thermoplastic except the spring and seal.

5. An improved reverse osmosis water purifier faucet fitting for connecting to a faucet equipped with a male coupling adapter comprising means for cooperating with a reverse osmosis purifier, including:
    a) a body, having a top, a bottom and a split barbed side connector, the top having a plurality of upwardly extending fingers each containing an inward indentation of an outer boundary, said body further having a hollow chamber on the inside, the side connector, formed in triangle shape, further having three tapered bores each having a plurality of splits and internal pointed projections, for receiving and retaining matched unitedly sheathed resilient tubes, the body also having three fluid passageways terminating at the side connector providing fluid communication with the bores, the bottom of the body having partial turn ramped external threads and a centrally located valve seat in alignment with one of the passageways in the body,
    b) a cylindrical jaw keeper sleeve having a plurality of cavities positioned peripherically therethrough snappingly engaging the body upstanding fingers permitting the sleeve to be retainably positioned on the top of the body and held in place by the fingers, further said sleeve having a plurality of slots through the sleeve between the notches, and a circular groove in the sleeve above the cavities,
    c) a plurality of inwardly facing locking jaws, having a bevel on one side, slideably positioned within the slots of the keeper sleeve lockingly embracing the faucet adapter when the fitting is placed thereupon,
    d) an enclosing ring pressed into the circular groove in the keeper sleeve covering and enclosing the cavities,
    e) a compression spring contiguous with the top of the body, sleeve and retaining ring for maintaining a locked position of the fitting to the faucet adapter,
    f) a retracting collar passing over the sleeve maintaining the jaws in an outward position when urged away from the body by the spring thus permitting the jaws to retract when manually forcing the fitting to be removed from the faucet in a quick-disconnect fashion,
    g) a resilient double lip seal disposed within the cavity of the body providing a hermetic seal between the fitting and the adapter when the fitting is engaged thereupon,
    h) a hollow tube retainer having internal indentations snappingly disposed over the split side connector adjacent to the tube receiving tapered bores with the indentations locking into the side connector barbs maintaining a fluid tight tube seal therewith,
    i) a hollow cap-like two-position valve having a plurality of inwardly projecting teeth in mating relationship with the partial turn external thread of the body allowing free but limited rotation, the valve also having a centrally located cone shaped needle with vents aligned with the seat in the body maintaining a close space relationship therebetween in a first position and a spaced open relationship when rotated to a second position permitting a small amount of fluid to pass through the vents in a first position for metering and a large amount to pass in a second position for flushing deposits from the purifier exiting the valve through the vent, the valve also having a plurality of overflow openings on a bottom surface adjacent to the needle, and j) a diffuser attached to the valve beneath the vents for diffusing water when flushing deposits from the purifier, the faucet fitting providing a conduit for water from the faucet to the purifier and a path to eject overflow water also to meter flow of rejected concentrates with a high pressure drop or flushing deposits depending upon the position of the valve.

6. The faucet fitting as recited in claim 5 wherein said three passageways further comprise:

a first passageway, a second passageway and a third passageway, the first passageway having an inlet within the body in communication with the body cavity and an outlet at the side connector for supplying water from the faucet to the purifier, the second passageway having an entry at the side connector and an exit adjacent to the valve seat allowing an unrestricted flowpath therebetween for ejecting overflow water from the purifier, and the third passageway having ingress at the side connector and egress at the valve providing a conduit for rejection of concentrates from the purifier when the valve is in a metering position and flushing deposits from the purifier when the valve is in an open position.

7. The faucet fitting as recited in claim 5 further comprising, said jaw keeper sleeve having a upright projection on the inside of the slot and said locking jaw having a groove therein such that the jaw projection slideably interfaces with groove eliminating the possibility improper installation.

8. The faucet fitting as recited in claim 5 wherein the plurality of jaws are defined as six individual jaws and the bevel is positioned nearest to the top of the body.

9. The faucet fitting as recited in claim 5 wherein said seal further comprises a resilient body folded double into a U-shape ring having the ability to seal both on the doubled portion to the faucet adapter and sealing against the cavity of the body under water pressure.

10. The faucet fitting as recited in claim 5 wherein said tube retainer further comprises a first end and a second end with the first end locking over the side connector and the second end having an aperture the same configuration as a sheath containing three resilient tubes, permitting a tight slit fit between a tube sheath and the retainer.

11. The faucet fitting as recited in claim 5 further comprises a top for the valve at each rotational termination formed integrally with the external threads on the fitting body.

12. The faucet fitting as recited in claim 5 wherein said diffuser further comprises a raised neck that is tightly pressed into the valve beneath the overflow openings holding the diffuser in place.

13. The faucet fitting as recited in claim 5 wherein the fitting is constructed from injection molded thermoplastic except the spring and seal.

* * * * *